United States Patent
Hashimoto et al.

(10) Patent No.: US 11,850,691 B2
(45) Date of Patent: Dec. 26, 2023

(54) FASTENING SYSTEM AND FASTENING METHOD

(71) Applicant: HONDA MOTOR CO., LTD., Tokyo (JP)

(72) Inventors: Daisuke Hashimoto, Tokyo (JP); Kento Aono, Tokyo (JP); Ginga Kitase, Tokyo (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 17/902,858

(22) Filed: Sep. 4, 2022

(65) Prior Publication Data

US 2023/0076763 A1 Mar. 9, 2023

(30) Foreign Application Priority Data

Sep. 8, 2021 (JP) .................................. 2021-145999

(51) Int. Cl.
  *B23P 19/06* (2006.01)
  *B23P 21/00* (2006.01)
  *B25J 11/00* (2006.01)

(52) U.S. Cl.
  CPC ........... *B23P 19/066* (2013.01); *B23P 21/004* (2013.01); *B25J 11/005* (2013.01)

(58) Field of Classification Search
  CPC ............ B23P 19/06; B23P 19/065–066; B23P 21/004; B23P 21/008; Y10T 29/49829; Y10T 29/53048–53052; Y10T 29/534; Y10T 29/53417; Y10T 29/53435; Y10T 29/53548; Y10T 29/49766; Y10T 29/49769; Y10T 29/49771; Y10T 29/49778–4978; B25J 11/005
  See application file for complete search history.

(56) References Cited

U.S. PATENT DOCUMENTS

| 4,977,667 | A | * | 12/1990 | Sekimoto | ............... | B62D 65/12 |
| | | | | | | 29/799 |
| 2008/0178713 | A1 | * | 7/2008 | Long | ...................... | B25B 23/14 |
| | | | | | | 73/862.21 |
| 2011/0048649 | A1 | * | 3/2011 | Komatsu | ................. | B23P 19/04 |
| | | | | | | 157/1.35 |
| 2017/0326695 | A1 | * | 11/2017 | Danebergs | .............. | B23P 19/06 |

FOREIGN PATENT DOCUMENTS

| JP | 2001-162462 A | 6/2001 | | |
| WO | WO-2016103298 A1 | * | 6/2016 | .............. B23P 19/06 |

OTHER PUBLICATIONS

Translation of WO2016103298 (Year: 2016).*

* cited by examiner

*Primary Examiner* — Matthew P Travers
(74) *Attorney, Agent, or Firm* — Carrier, Shende & Associates P.C.; Fulchand P. Shende; Joseph P. Carrier

(57) ABSTRACT

A fastening system for fastening a fastener to a workpiece, includes a movable carriage on which the workpiece is placed, a coordinate detection unit configured to detect a position of the fastener temporarily tightened onto the workpiece as coordinates in a coordinate system of the movable carriage, a storage device configured to store the coordinates detected by the coordinate detection unit, and a retightening device configured to determine a position of the fastener based on the coordinates stored in the storage device and retighten the fastener that is at the determined position.

5 Claims, 7 Drawing Sheets

FIG. 5    122

| ID | COORDINATES (T, B, H) | TORQUE | ORDER |
|---|---|---|---|
| XXXXX | T1, B1, H1 | Tr1 | 1 |
| XXXXX | T2, B2, H2 | Tr2 | 2 |
| XXXXX | T3, B3, H3 | Tr3 | 3 |
| ⋮ | ⋮ | ⋮ | ⋮ |

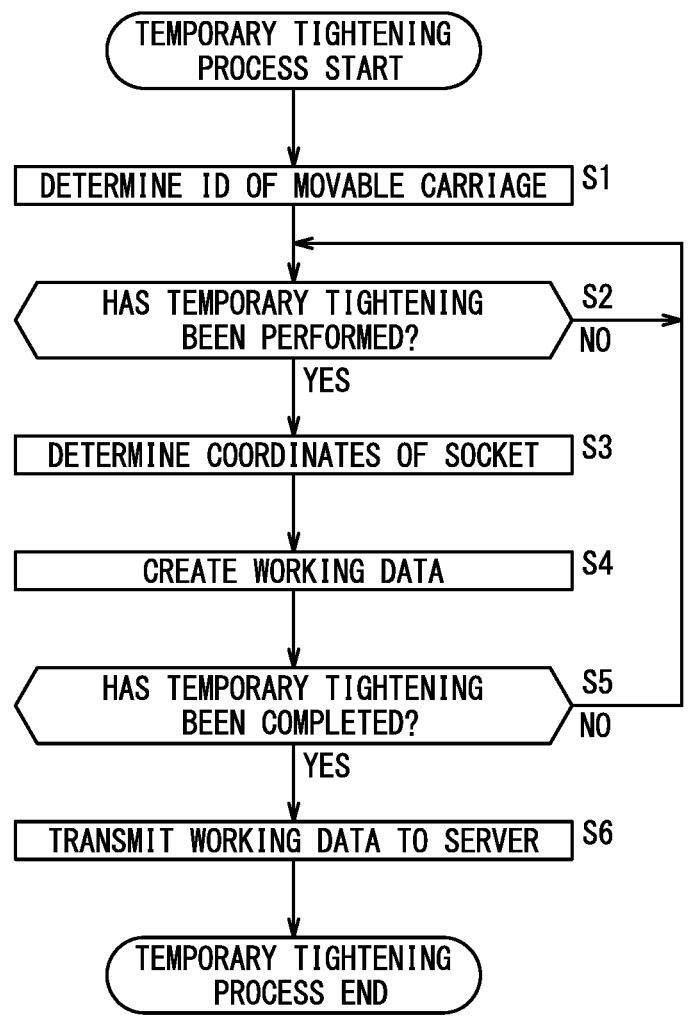

FASTENING SYSTEM AND FASTENING METHOD

CROSS-REFERENCE TO RELATED APPLICATIONS

This application is based upon and claims the benefit of priority from Japanese Patent Application No. 2021-145999 filed on Sep. 8, 2021, the contents of which are incorporated herein by reference.

BACKGROUND OF THE INVENTION

Field of the Invention

The present invention relates to a fastening system and a fastening method for fastening a fastener to a workpiece.

Description of the Related Art

JP 2001-162462 A shows an automatic nut runner device. The nut runner device retightens the nut temporarily tightened onto a workpiece in the following procedure. The workpiece is fixed at a fixed position on a table. The table is arranged in a fixed position in front of the nut runner device. The nut runner device moves the nut runner to retighten the nut temporarily tightened onto the workpiece.

SUMMARY OF THE INVENTION

In the nut runner device disclosed in JP 2001-162462 A, it is necessary to fix each workpiece to a fixed position on the table each time retightening is performed. In order to fix the workpiece at a fixed position on the table, it is necessary to accurately position the workpiece with respect to the table. Accordingly, the number of working processes increases. Therefore, there is a demand for a technique capable of automatically retightening the fastener regardless of the position of the workpiece on the table.

An object of the present invention is to solve the aforementioned problem.

According to a first aspect of the present invention, there is provided a fastening system for fastening a fastener to a workpiece, the fastening system including: a movable carriage on which the workpiece is placed; a coordinate detection unit configured to detect a position of the fastener temporarily tightened onto the workpiece as coordinates in a coordinate system of the movable carriage; a storage device configured to store the coordinates detected by the coordinate detection unit; and a retightening device configured to determine a position of the fastener based on the coordinates stored in the storage device and retighten the fastener that is at the determined position.

According to a second aspect of the present invention, there is provided a fastening method for fastening a fastener to a workpiece placed on a movable carriage, the fastening method including: a coordinate detection step of, with a coordinate detection unit, detecting a position of the fastener temporarily tightened onto the workpiece, as coordinates in a coordinate system of the movable carriage; a storage step of, with a storage device, storing the coordinates; and a retightening step of, with a retightening device, determining a position of the fastener based on the coordinates stored in the storage device and retightening the fastener that is at the determined position.

According to the present invention, it is possible to suppress an increase in the number of working processes.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a diagram showing working data;

FIG. 6 is a flowchart of a temporary tightening process; and

DESCRIPTION OF THE INVENTION

1. Fastening Area 100

Figure 1:
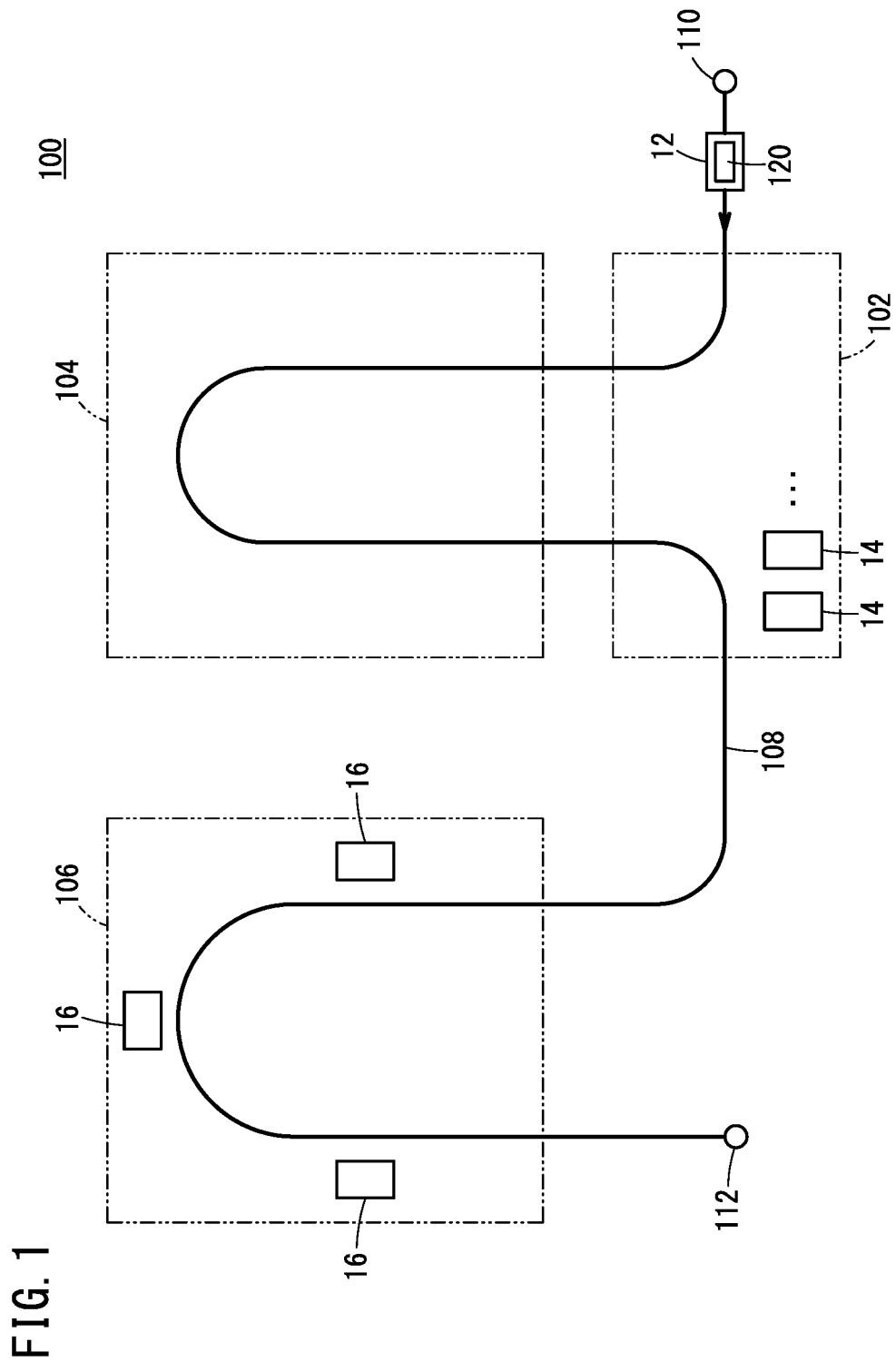
FIG. 1 is a top view of a fastening area.

FIG. 1 is a top view of a fastening area 100. The fastening area 100 is an area in which an operation (work) of fastening a fastener to a workpiece 120 is performed. The fastening area 100 is provided in a factory. The fastening area 100 is adjacent to a pre-process area (not illustrated) in which an operation of a pre-process of the fastening process is performed. The fastening area 100 is adjacent to a post-process area (not illustrated) in which an operation of a post-process of the fastening process is performed.

The fastening area 100 includes an attachment/detachment area 102, a temporary tightening area 104, and a retightening area 106. A guide path 108 for a movable carriage 12 is laid on the floor surface of the fastening area 100. The guide path 108 is formed by, for example, a magnetic marker, a magnetic tape, or the like. One end of the guide path 108 is a starting point 110. The other end of the guide path 108 is a terminal point 112. The starting point 110 is connected to a guide path of the pre-process area. The terminal point 112 is connected to a guide path of the post-process area. The movable carriage 12 moves from the guide path of the pre-process area to the starting point 110. The movable carriage 12 travels along the guide path 108 from the starting point 110 to the terminal point 112. The movable carriage 12 advances from the terminal point 112 to the guide path of the post-process area. It is possible for a plurality of movable carriages 12 to move simultaneously on the guide path 108 from the starting point 110 to the terminal point 112. The guide path 108 extends over the attachment/detachment area 102, the temporary tightening area 104, and the retightening area 106.

The attachment/detachment area 102 is an area in which an operation of coupling a temporary tightening unit 14 to the movable carriage 12 is performed. Further, the attachment/detachment area 102 is also an area in which an operation of separating the temporary tightening unit 14 from the movable carriage 12 is performed. The temporary tightening area 104 is an area in which an operation of temporarily tightening a fastener onto the workpiece 120 is performed. This operation is referred to as a temporary tightening operation. The retightening area 106 is an area in which an operation of retightening a fastener is performed. This operation is referred to as a retightening operation.

In the present specification, the fastener is a nut. The nut is fastened to a bolt disposed in the workpiece 120. However, the fastener need not necessarily be a nut. For example, the fastener may be a bolt, a screw, etc.

2. Configuration of Fastening System 10

Figure 2:
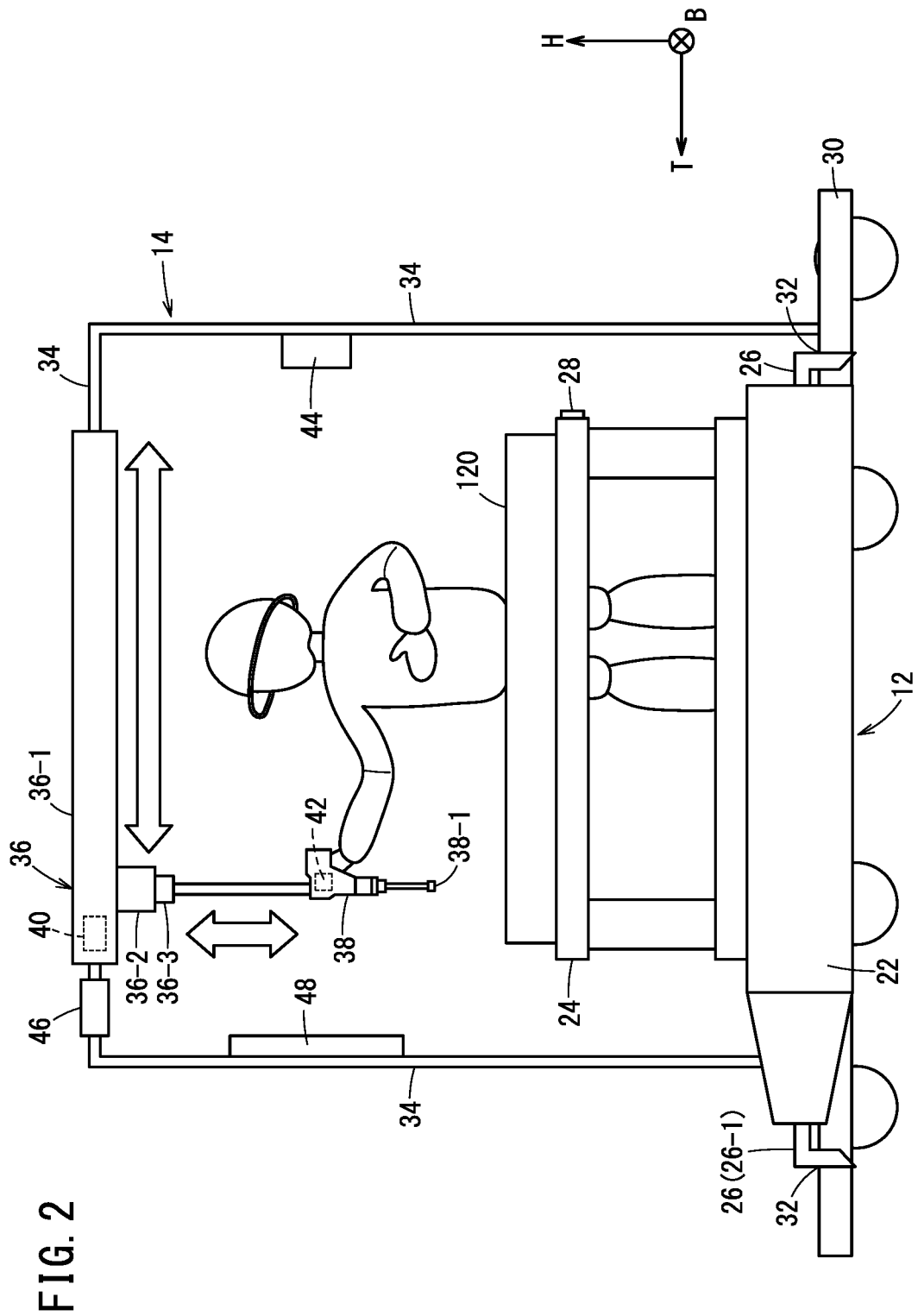
FIG. 2 is a schematic view of a movable carriage and a temporary tightening unit.
Figure 3:
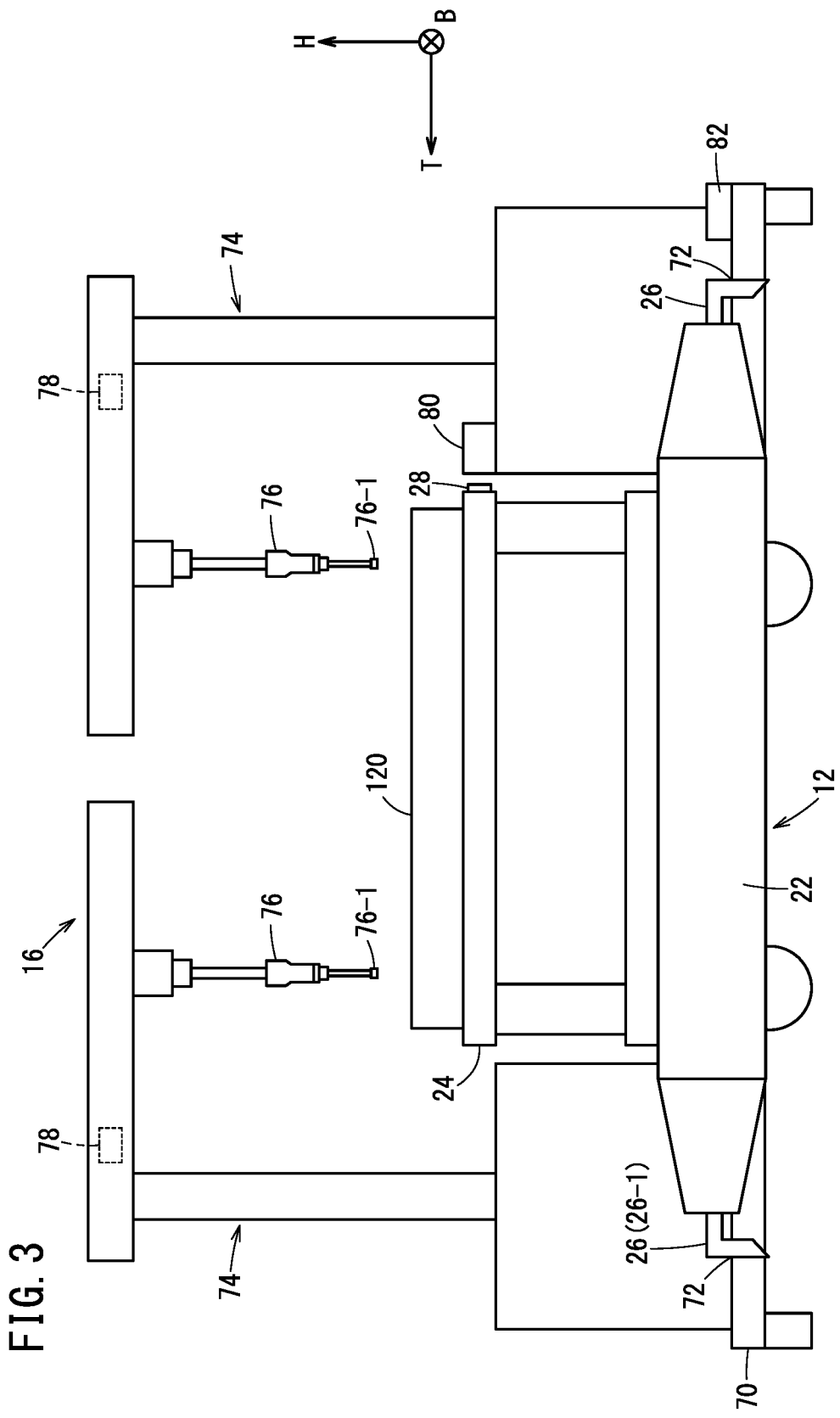
FIG. 3 is a schematic view of the movable carriage and a retightening unit.
Figure 4:
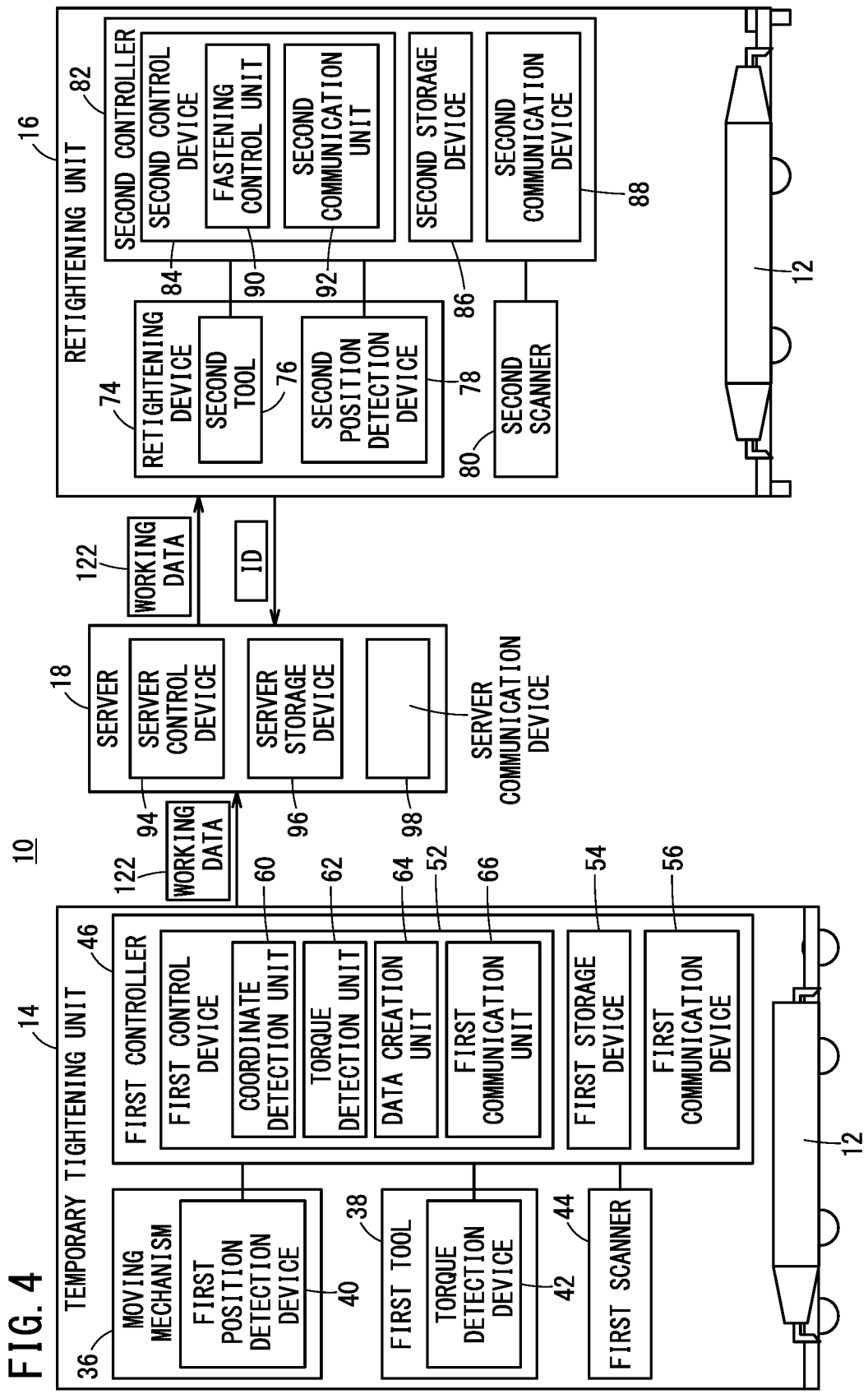
FIG. 4 is a block diagram of a fastening system.

FIG. 2 is a schematic view of the movable carriage 12 and the temporary tightening unit 14. FIG. 3 is a schematic view of the movable carriage 12 and a retightening unit 16. FIG. 4 is a functional block diagram of the fastening system 10. The fastening system 10 is provided in the fastening area 100. The fastening system 10 includes at least one movable carriage 12, at least one temporary tightening unit 14, at least one retightening unit 16, and a server 18.

[2-1. Movable Carriage 12]

The movable carriage 12 will be described with reference to FIG. 2. The movable carriage 12 is an automated guided vehicle. The movable carriage 12 transports the workpiece 120 inside the fastening area 100. The movable carriage 12 can autonomously travel along the guide path 108. The movable carriage 12 reaches the terminal point 112 from the starting point 110 via the attachment/detachment area 102, the temporary tightening area 104, the attachment/detachment area 102, and the retightening area 106. The movable carriage 12 includes a carriage part 22, a table 24, and a plurality of pins 26.

The carriage part 22 includes various devices for autonomous traveling. For example, the carriage part 22 includes a body, a battery, a motor, a driving device, wheels, a steering device, a sensor that detects the guide path 108, a processor, and the like.

The table 24 is fixed to an upper portion of the carriage part 22. A workpiece 120 is placed on the table 24. Fasteners are fastened to the workpiece 120 in the temporary tightening area 104 and the retightening area 106. A label 28 is attached to a predetermined position of the table 24. An identifier (ID) of the movable carriage 12 is described on the label 28. For example, the ID is indicated by a one dimensional code, a two dimensional code, or the like. An individual ID is allocated to each movable carriage 12.

The plurality of pins 26 protrude from a side surface of the carriage part 22. The plurality of pins 26 are members for coupling the movable carriage 12 and the temporary tightening unit 14 together. Further, the plurality of pins 26 are also members for coupling the movable carriage 12 and the retightening unit 16 together. One of the plurality of pins 26 is a reference pin 26-1. The position of the reference pin 26-1 is a reference position in the coordinate system of the movable carriage 12.

The coordinate system of the movable carriage 12 is a TBH coordinate system. The T-axis and the B-axis both extend in the horizontal direction. The T-axis extends in a traveling direction in which the movable carriage 12 travels straight. The B-axis is orthogonal to the T-axis. The H-axis extends in the up-down direction. The H-axis is orthogonal to the T-axis and the B-axis.

[2-2. Temporary Tightening Unit 14]

The temporary tightening unit 14 will be described with reference to FIGS. 2 and 4. The temporary tightening unit 14 collects data relating to the temporary tightening operation and transmits the data to the server 18. The temporary tightening unit 14 is a device that can be coupled to the movable carriage 12 and can be separated from the movable carriage 12. The temporary tightening unit 14 is placed in the attachment/detachment area 102. The temporary tightening unit 14 moves in the temporary tightening area 104 together with the movable carriage 12 after having been coupled to the movable carriage 12 in the attachment/detachment area 102. After moving in the temporary tightening area 104 together with the movable carriage 12, the temporary tightening unit 14 is separated from the movable carriage 12 in the attachment/detachment area 102. The temporary tightening unit 14 separated from the movable carriage 12 is again placed in the attachment/detachment area 102. The temporary tightening unit 14 includes a driven carriage (working carriage) 30, a plurality of first coupling portions 32, a support portion 34, a moving mechanism 36, a first tool 38 (temporary tightening device), a first position detection device 40, a torque detection device 42, a first scanner 44, a first controller 46, and a monitor 48.

The driven carriage 30 is a carriage on which an operator (worker) can be placed. The driven carriage 30 includes a body, wheels, and the like. A plurality of first coupling portions 32 are formed on the body of the driven carriage 30. The temporary tightening unit 14 and the movable carriage 12 are coupled to each other by coupling the first coupling portions 32 to the respective pins 26. When the temporary tightening unit 14 and the movable carriage 12 are coupled together, the temporary tightening unit 14 is positioned with respect to the movable carriage 12. The temporary tightening unit 14 and the movable carriage 12 are separated from each other by separating the first coupling portions 32 from the respective pins 26. The driven carriage 30 does not have a drive source such as a motor. Therefore, the temporary tightening unit 14 is pulled by the movable carriage 12.

The support portion 34 is fixed to an upper portion of the driven carriage 30. The support portion 34 includes a pair of longitudinal members and a transverse member. One of the pair of longitudinal members extends upward from a front portion of the driven carriage 30. The other of the pair of longitudinal members extends upward from a rear portion of the driven carriage 30. A transverse member is fixed to the top of each longitudinal member. The support portion 34 defines a working space in which the operator performs a temporary tightening operation. The support portion 34 supports the moving mechanism 36, the first controller 46, and the monitor 48.

The moving mechanism 36 is fixed to an upper portion of the support portion 34. The moving mechanism 36 includes a first linear guide 36-1, a second linear guide 36-2, and an expansion/contraction unit (extendable portion) 36-3. The first linear guide 36-1 supports the second linear guide 36-2. The first linear guide 36-1 extends along the T-axis in a state where the temporary tightening unit 14 is positioned on the movable carriage 12. Therefore, the second linear guide 36-2, the expansion/contraction unit 36-3, and the first tool 38 are movable along the T-axis. The second linear guide 36-2 supports the expansion/contraction unit 36-3. The second linear guide 36-2 extends along the B-axis in a state where the temporary tightening unit 14 is positioned on the movable carriage 12. Therefore, the expansion/contraction unit 36-3 and the first tool 38 are movable along the B-axis. The expansion/contraction unit 36-3 supports the first tool 38. The expansion/contraction unit 36-3 can expand and contract along the H-axis. Therefore, the first tool 38 is movable along the H-axis.

The first tool 38 is a tool for fastening a fastener to the workpiece 120. Examples of the first tool 38 include an impact wrench, a nut runner, and the like. The first tool 38 has a contact portion 38-1 that contacts the fastener. The contact portion 38-1 is, for example, a socket. The first tool 38 is operated by the operator. That is, the operator grips the first tool 38 and moves the first tool 38 to a temporary tightening position. Thereafter, the operator operates the lever of the first tool 38 to temporarily tighten the fastener onto the workpiece 120.

The first position detection device 40 is provided in the moving mechanism 36. The first position detection device 40 detects the position of the first tool 38 in the TBH coordinate system. The first position detection device 40 includes a plurality of position detectors. The position detector may be, for example, a linear encoder. A first linear encoder detects the position of the second linear guide 36-2 with respect to the first linear guide 36-1. A second linear encoder detects the position of the expansion/contraction unit 36-3 with respect to the second linear guide 36-2. The third linear encoder detects the position of the first tool 38 with respect to the expansion/contraction unit 36-3. Each position detector transmits a detection value to the first controller 46.

The first position detection device 40 may include a camera. When the first position detection device 40 includes a camera, the camera transmits image data to the first controller 46. A first control device 52 performs image recognition based on the image data and determines the position of the first tool 38.

The torque detection device 42 is attached to the rotary shaft of the first tool 38. The torque detection device 42 detects torque acting on the rotary shaft of the first tool 38. The torque detection device 42 transmits the detection value to the first controller 46.

The first scanner 44 is attachable to and detachable from the support portion 34. An example of the first scanner 44 is an image scanner. The first scanner 44 is operated by the operator. The first scanner 44 reads a code written on the label 28. The first scanner 44 determines the ID indicated by the code or the like. The first scanner 44 transmits the ID to the first controller 46.

The first controller 46 is fixed to the driven carriage 30 or the support portion 34. As shown in FIG. 4, the first controller 46 includes a first control device 52, a first storage device 54, and a first communication device 56.

The first control device 52 includes a processing circuit. The processing circuit may be a processor such as a CPU. The processing circuit may be an integrated circuit such as an ASIC or a FPGA. The processor can execute various processes by executing programs stored in the first storage device 54. The first control device 52 functions as a coordinate detection unit 60, a torque detection unit 62, a data creation unit 64, and a first communication unit 66. The coordinate detection unit 60 determines the TBH coordinates of the temporarily tightened fastener based on data acquired from the first position detection device 40. The first position detection device 40 determines coordinates with reference to the reference pin 26-1. The torque detection unit 62 determines the torque generated when the fastener is temporarily tightened, based on data acquired from the torque detection device 42. This torque is referred to as a temporary tightening torque. The data creation unit 64 creates working data 122 shown in FIG. 5 based on various data. The first communication unit 66 controls the first communication device 56.

The first storage device 54 includes a volatile memory and a nonvolatile memory. As examples of the volatile memory, there may be cited a RAM or the like. As examples of the nonvolatile memory, there may be cited a ROM, a flash memory, or the like. The volatile memory temporarily stores, for example, data acquired from the outside, data calculated by the first control device 52, and the like. The nonvolatile memory stores, for example, a predetermined program, predetermined data, and the like. At least a portion of the first storage device 54 may be included in the above-described processor, the above-described integrated circuit, or the like.

The first communication device 56 includes a communication circuit for performing short-range wireless communication. Examples of the short-range wireless communication include Wi-Fi (registered trademark), Bluetooth (registered trademark), infrared communication, and the like. The first communication device 56 transmits the working data 122 created by the data creation unit 64 to the server 18.

The monitor 48 is fixed to the driven carriage 30 or the support portion 34. The monitor 48 is located at the same level as the operator's eye level. The monitor 48 displays, for example, the procedure of the temporary tightening operation. The monitor 48 may display other information relating to the temporary tightening operation.

[2-3. Retightening Unit 16]

The retightening unit 16 will be described with reference to FIGS. 3 and 4. The retightening unit 16 automatically performs the retightening operation. The retightening unit 16 is a device that can be coupled to the movable carriage 12 and can be separated from the movable carriage 12. At least one retightening unit 16 is arranged in the retightening area 106. The retightening unit 16 includes a base 70, a plurality of second coupling portions 72, at least one retightening device 74, at least one second position detection device 78, a second scanner 80, and a second controller 82.

The base 70 is fixed to a floor surface of a factory. The plurality of second coupling portions 72 are formed on the base 70. By coupling the second coupling portions 72 to the respective pins 26, the retightening unit 16 and the movable carriage 12 are coupled to each other. When the retightening unit 16 and the movable carriage 12 are coupled together, the retightening unit 16 is positioned with respect to the movable carriage 12. By separating the second coupling portions 72 from the respective pins 26, the retightening unit 16 and the movable carriage 12 are separated from each other.

The retightening device 74 is fixed on the base 70. In the present embodiment, a plurality of retightening devices 74 are fixed on the base 70. The retightening device 74 is, for example, an orthogonal robot (Cartesian coordinate robot). The orthogonal robot can perform the retightening operation in accordance with an operation instruction output from the second controller 82. The orthogonal robot has three slide shafts. The first slide shaft extends along the T-axis. The second slide shaft extends along the B-axis. The third slide shaft extends along the H-axis. The retightening device 74 supports a second tool 76. The retightening device 74 is capable of moving the second tool 76 along the T-axis, the B-axis, and the H-axis. Further, the retightening device 74 is capable of retightening the fastener with the second tool 76. The retightening device 74 may be an articulated robot having a plurality of joints.

The second tool 76 is a tool for fastening a fastener to the workpiece 120. Examples of the second tool 76 include an impact wrench, a nut runner, etc. The second tool 76 has a contact portion 76-1 that contacts the fastener. The contact portion 76-1 is, for example, a socket.

The second position detection device 78 is provided in the retightening device 74. The second position detection device 78 detects the position of the second tool 76 in the TBH coordinate system. The second position detection device 78 includes a plurality of position detectors. Examples of the position detector include a linear encoder and a rotary encoder. Each position detector transmits a detection value to the second controller 82.

The second position detection device 78 may include a camera. When the second position detection device 78 includes a camera, the camera transmits image data to the second controller 82. A second control device 84 performs image recognition based on the image data and determines the position of the second tool 76.

The second scanner 80 is fixed to a predetermined position of the retightening unit 16. An example of the second scanner 80 is an image scanner. In a state where the retightening unit 16 and the movable carriage 12 are coupled to each other, the second scanner 80 and the label 28 are face-to-face with each other. The second scanner 80 reads a code written on the label 28. The second scanner 80 determines the ID indicated by the code or the like. The second scanner 80 transmits the ID to the second controller 82.

The second controller 82 is provided at a desired position of the retightening unit 16. As shown in FIG. 4, the second controller 82 includes a second control device 84, a second storage device 86, and a second communication device 88.

The second control device 84 includes a processing circuit. The processing circuit may be a processor such as a CPU. The processing circuit may be an integrated circuit such as an ASIC or a FPGA. The processor can execute various processes by executing programs stored in the second storage device 86. The second control device 84 functions as a fastening control unit 90 and a second communication unit 92. The fastening control unit 90 controls the operation of the retightening device 74 based on the working data 122 acquired from the server 18. The second communication unit 92 controls the second communication device 88.

The second storage device 86 includes a volatile memory and a nonvolatile memory. As examples of the volatile memory, there may be cited a RAM or the like. As examples of the nonvolatile memory, there may be cited a ROM, a flash memory, or the like. The volatile memory stores, for example, data acquired from the outside, data calculated by the second control device 84, and the like. The nonvolatile memory stores, for example, a predetermined program, predetermined data, and the like. At least a portion of the second storage device 86 may be included in the above-described processor, the above-described integrated circuit, or the like.

The second communication device 88 includes a communication circuit for performing short-range wireless communication. Examples of the short-range wireless communication include Wi-Fi (registered trademark), Bluetooth (registered trademark), infrared communication, and the like. The second communication device 88 transmits the ID determined by the second scanner 80 to the server 18. The second communication device 88 also acquires the working data 122 from the server 18.

[2-4. Server 18]

The server 18 will be described with reference to FIG. 4. The server 18 is a computer. The server 18 stores the working data 122 acquired from the first controller 46 of the temporary tightening unit 14. The server 18 includes a server control device 94, a server storage device 96, and a server communication device 98.

The server control device 94 includes a processing circuit. The processing circuit may be a processor such as a CPU. The processing circuit may be an integrated circuit such as an ASIC or a FPGA. The processor can execute various types of processing by executing programs stored in the server storage device 96.

The server storage device 96 includes a volatile memory and a nonvolatile memory. As examples of the volatile memory, there may be cited a RAM or the like. As examples of the nonvolatile memory, there may be cited a ROM, a flash memory, or the like. The volatile memory stores, for example, data acquired from the outside, data calculated by the server control device 94, and the like. The volatile memory stores working data 122 shown in FIG. 5. The nonvolatile memory stores, for example, a predetermined program, predetermined data, and the like. At least a portion of the server storage device 96 may be included in the above-described processor, the above-described integrated circuit, or the like.

The server communication device 98 includes a communication circuit for performing short-range wireless communication. Examples of the short-range wireless communication include Wi-Fi (registered trademark), Bluetooth (registered trademark), infrared communication, and the like. The server communication device 98 acquires the working data 122 from the first controller 46 of the temporary tightening unit 14. The server communication device 98 acquires the ID from the second controller 82 of the retightening unit 16. The server communication device 98 transmits the working data 122 corresponding to the ID to the second controller 82 of the retightening unit 16.

3. Fastening Operation

Hereinafter, an operation of fastening a nut to a bolt will be described as the fastening operation. The workpiece 120 has a plurality of bolts. The fastening system 10 fastens a nut as a fastener to each bolt.

The movable carriage 12 is disposed at the starting point 110. At this time, the workpiece 120 is placed at a desired position on the table 24. The movable carriage 12 starts autonomous traveling from the starting point 110. The movable carriage 12 enters the attachment/detachment area 102. The operator couples the temporary tightening unit 14 to the movable carriage 12 in the attachment/detachment area 102. After the coupling, the operator gets on the driven carriage 30.

The movable carriage 12 exits the attachment/detachment area 102 and enters the temporary tightening area 104. While the movable carriage 12 and the driven carriage 30 are traveling in the temporary tightening area 104, the operator performs the temporary tightening operation, on the driven carriage 30. Specifically, the operator operates the first tool 38 to temporarily tighten the nut. During the temporary tightening operation, each part of the temporary tightening unit 14 performs a temporary tightening process shown in FIG. 6. The operator completes the temporary tightening operation in the temporary tightening area 104. The movable carriage 12 and the driven carriage 30 exit the temporary tightening area 104 and enter the attachment/detachment area 102 again. The operator separates the temporary tightening unit 14 from the movable carriage 12 in the attachment/detachment area 102.

The movable carriage 12 exits the attachment/detachment area 102 and enters the retightening area 106. When the movable carriage 12 reaches the position of the retightening unit 16, the movable carriage 12 and the retightening unit 16 are coupled to each other. After the coupling, the retightening device 74 performs the retightening operation. During the retightening operation, each part of the retightening unit 16 performs a retightening process shown in FIG. 7. When the retightening process is completed, the movable carriage 12 and the retightening unit 16 are separated from each other. The movable carriage 12 exits the retightening area 106 and reaches the terminal point 112.

[3-1. Temporary Tightening Process]

FIG. 6 is a flowchart of a temporary tightening process. As described above, during the temporary tightening operation, each part of the temporary tightening unit 14 performs the temporary tightening process shown in FIG. 6.

In step S1, the operator moves the first scanner 44 to the front of the label 28. The first scanner 44 reads the code of the label 28 and determines the ID of the movable carriage 12. The first storage device 54 stores the ID. When step S1 is completed, the process transitions to step S2.

In step S2, the coordinate detection unit 60 determines whether or not the nut has been temporarily tightened. For example, the coordinate detection unit 60 determines that the temporary tightening has been performed when the detection value of the torque detection device 42 is equal to or greater than a threshold value. The coordinate detection unit 60 may determine that the temporary tightening has been performed when the lever operation of the first tool 38 has been detected. When the nut has been temporarily tightened (step S2: YES), the process proceeds to step S3. On the other hand, when the nut has not yet been temporarily tightened (step S2: NO), the determination of step S2 is repeatedly executed.

In step S3, the coordinate detection unit 60 determines the coordinates of the socket (contact portion 38-1) of the first tool 38. The coordinate detection unit 60 converts each detection value of the first position detection device 40 into coordinates of the TBH coordinate system using a predetermined conversion formula. The predetermined conversion formula is stored in the first storage device 54. The coordinates of the socket correspond to the coordinates of the temporary tightening position. The coordinate detection unit 60 detects the coordinates and counts the order in which the sockets have been temporarily tightened. The first storage device 54 stores the coordinates of the sockets and the order in which the sockets have been temporarily tightened. In addition, the first storage device 54 stores the detection value of the torque detection device 42 as the temporary tightening torque. When step S3 is completed, the process transitions to step S4.

In step S4, the data creation unit 64 creates the working data 122. As illustrated in FIG. 5, the working data 122 is data in which the ID of the movable carriage 12, the coordinates of the temporary tightening position, the temporary tightening torque, and (the number in) the order (i.e., the ordinal number) of the temporary tightening are associated with one another. The data creation unit 64 creates the working data 122 by associating the ID acquired in step S1, the coordinates acquired in step S3, the torque, and (the number in) the order with one another. When step S4 is completed, the process transitions to step S5.

In step S5, the coordinate detection unit 60 determines whether or not temporary tightening of all the nuts has been completed. For example, the coordinate detection unit 60 determines that the temporary tightening has been completed at a point in time when a predetermined number of temporary tightening operations have been completed. Alternatively, the coordinate detection unit 60 may determine that the temporary tightening has been completed at a time point when the operator operates a switch (not illustrated). When temporary tightening of all the nuts has been completed (step S5: YES), the process proceeds to step S6.

On the other hand, in a case where the temporary tightening with respect to any nut is not completed (step S5: NO), the processing returns to step S2.

In step S6, the first communication unit 66 controls the first communication device 56 to transmit the working data 122 to the server 18. The server control device 94 acquires the working data 122 via the server communication device 98. The server storage device 96 stores the working data 122 acquired by the server control device 94. When step S6 ends, the temporary tightening process ends.

[3-2 Retightening Process]

Figure 7:
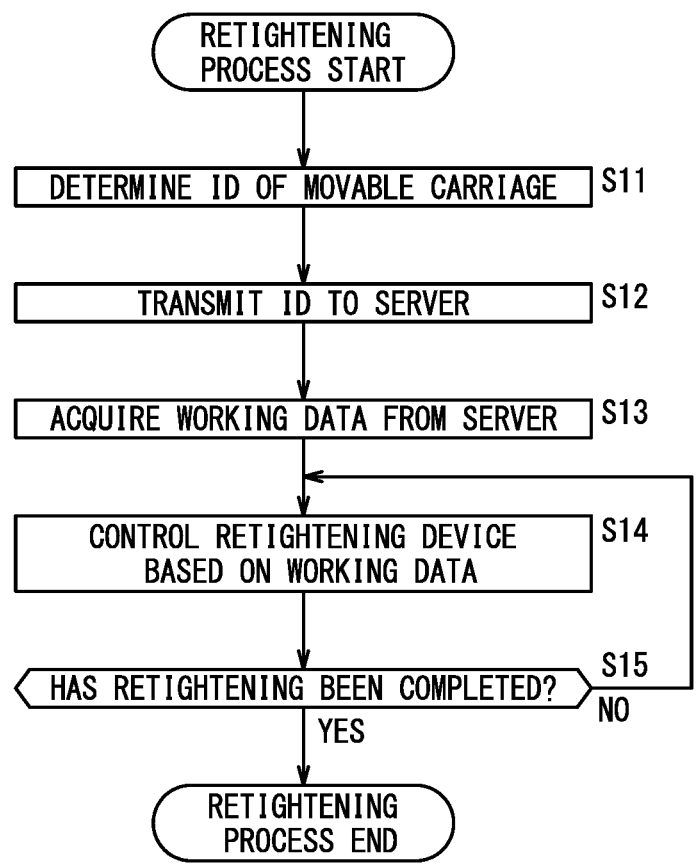
FIG. 7 is a flowchart of a retightening process.

FIG. 7 is a flowchart of the retightening process. As described above, during the retightening operation, each part of the retightening unit 16 performs the retightening process shown in FIG. 7.

In step S11, when the movable carriage 12 and the retightening unit 16 are coupled together, the second scanner 80 is positioned face-to-face with the label 28. The second scanner 80 reads the code of the label 28 and determines the ID of the movable carriage 12. The second storage device 86 stores the ID. Upon completion of step S11, the process proceeds to step S12.

In step S12, the second communication unit 92 controls the second communication device 88 to transmit the ID to the server 18. The server control device 94 acquires the ID via the server communication device 98. The server control device 94 uses the ID to search the server storage device 96 to obtain the working data 122 that matches with the ID. Upon completion of step S12, the process proceeds to step S13.

In step S13, the server control device 94 transmits the working data 122 to the second controller 82 via the server communication device 98. The second communication unit 92 acquires the working data 122 via the second communication device 88. The second storage device 86 stores the working data 122 acquired by the second communication unit 92. Upon completion of step S13, the process proceeds to step S14.

In step S14, the fastening control unit 90 controls the retightening device 74 based on the working data 122. The fastening control unit 90 selects, from among the coordinates recorded in the working data 122, coordinates at which the retightening has not yet been completed. Further, the fastening control unit 90 selects coordinates having the lowest number in the order, from among the coordinates for which the retightening has not yet been completed. The fastening control unit 90 moves the second tool 76 and places the contact portion 76-1 (socket) at the selected coordinates. The fastening control unit 90 performs positioning of the second tool 76 by using feedback control based on the detection value of the second position detection device 78. The fastening control unit 90 performs retightening of the nut after positioning of the second tool 76. The fastening control unit 90 may refer to the torque associated with the coordinates and thereby control the torque for retightening. Upon completion of step S14, the process proceeds to step S15.

In step S15, the fastening control unit 90 determines whether or not the retightening of all the nuts has been completed. If the retightening of all the nuts has been completed (step S15: YES), the retightening process ends. On the other hand, in a case where the retightening of any nut is not completed (step S15: NO), the process returns to step S14.

In the present embodiment, both the temporary tightening unit 14 and the retightening unit 16 use the TBH coordinate system with the reference pin 26-1 as a reference position.

According to the present embodiment, the coordinate detection unit 60 can detect the coordinates of the workpiece 120 even if the workpiece 120 is not placed at a fixed position on the table 24. Further, even if the workpiece 120 is not placed at a fixed position on the table 24, the fastening control unit 90 can perform retightening based on the coordinates detected by the coordinate detection unit 60. As described above, according to the present embodiment, even if the workpiece 120 is not placed at a fixed position on the table 24, retightening can be automatically performed.

In the present embodiment, the temporary tightening unit 14 is positioned with respect to the movable carriage 12 by the first coupling portion 32 being coupled to the reference pin 26-1. Therefore, the coordinate detection unit 60 can recognize the TBH coordinate system of the movable carriage 12 by recognizing the first coupling portion 32 as the reference position in advance. In the present embodiment, the second coupling portion 72 is coupled to the reference pin 26-1, whereby the retightening unit 16 is positioned with respect to the movable carriage 12. Therefore, the fastening control unit 90 can recognize the TBH coordinate system of the movable carriage 12 by recognizing the second coupling portion 72 as the reference position in advance.

4. Other Embodiments 4-1. Other Embodiment 1

Each movable carriage 12 may include a control device, a storage device, and a communication device. Further, the second communication device 88 and the communication device of each movable carriage 12 may communicate with each other. In this case, when the movable carriage 12 and the retightening unit 16 are coupled together, the control device of the movable carriage 12 transmits the working data 122 to the second controller 82 via the communication device. The second communication unit 92 acquires the working data 122 via the second communication device 88.

4-2. Other Embodiment 2

If the height of the table 24 of each movable carriage 12 is known, the H-axis coordinate of the fastening position is known. Therefore, the first position detection device 40 and the second position detection device 78 do not need to detect the height position of the fastener. Further, the coordinate detection unit 60 may not determine the H-axis coordinate. That is, the coordinate detection unit 60 may determine only the T-axis coordinate and the B-axis coordinate. In this case, any one of the storage devices may store the H-axis coordinate in advance. The H-axis coordinate corresponds to a height position obtained by adding the height of the fastening position to the height of the table 24.

4-3. Other Embodiment 3

The server control device 94 may have the function of the first control device 52. For example, the server control device 94 may include at least one of the coordinate detection unit 60, the torque detection unit 62, or the data creation unit 64. The server control device 94 may have the function of the second control device 84. For example, the server control device 94 may include the fastening control unit 90.

5. Invention Obtained from Embodiments

The invention that can be grasped from the above embodiments will be described below.

According to a first aspect of the present invention, there is provided the fastening system (10) for fastening a fastener to a workpiece (120), the fastening system including a movable carriage (12) on which the workpiece is placed, a coordinate detection unit (60) configured to detect a position of the fastener temporarily tightened onto the workpiece as coordinates in a coordinate system of the movable carriage, a storage device (96) configured to store the coordinates detected by the coordinate detection unit, and a retightening device (74) configured to determine a position of the fastener based on the coordinates stored in the storage device and retighten the fastener that is at the determined position.

According to the above configuration, even if the workpiece is not placed at a fixed position on the table, the retightening can be automatically performed. Therefore, it is not necessary to accurately position the workpiece with respect to the table. Therefore, according to the above configuration, it is possible to suppress an increase in the number of processes (workload).

In the first aspect of the present invention, the fastening system may further include a temporary tightening device (38) that is operated by an operator and is configured to temporarily tighten the fastener onto the workpiece in accordance with operation by the operator. Further, the temporary tightening device may include a contact portion (38-1) configured to make contact with the fastener, and the coordinate detection unit may detect the coordinates of the contact portion.

According to the above configuration, it is possible to easily determine the position of the temporarily tightened fastener.

In the first aspect of the present invention, the fastening system may further include a scanner (44) configured to detect an identifier assigned to the movable carriage, and the storage device may store the coordinates and the identifier in association with each other.

According to the above configuration, it is possible to identify the movable carriage. Therefore, the workpiece can be identified.

In the first aspect of the present invention, in a case where the plurality of fasteners are fastened to the workpiece, the storage device may store the coordinates and the number in the order in which the fasteners have been fastened, in association with each other, for each of positions at which the fasteners have been fastened.

In the first aspect of the present invention, the fastening system may further include a torque detection device (42) configured to detect a torque applied to the fastener by the temporary tightening device, and the storage device may store the coordinates and the torque in association with each other.

In the first aspect of the present invention, the fastening system may further include a working carriage (30) on which the temporary tightening device is placed. Further, the movable carriage may include a reference pin (26-1) as a reference position in the coordinate system, the working carriage may include a first coupling portion (32) configured to be coupled to the reference pin, and the retightening device may include a second coupling portion (72) configured to be coupled to the reference pin.

According to a second aspect of the present invention, there is provided the fastening method for fastening a fastener to a workpiece placed on a movable carriage, the fastening method including: a coordinate detection step of, with a coordinate detection unit, detecting a position of the fastener temporarily tightened onto the workpiece, as coordinates in a coordinate system of the movable carriage; a storage step of, with a storage device, storing the coordinates; and a retightening step of, with a retightening device, determining a position of the fastener based on the coordinates stored in the storage device and retightening the fastener that is at the determined position.

The present invention is not limited to the above disclosure, and various modifications are possible without departing from the essence and gist of the present invention.

What is claimed is:

1. A fastening system for fastening a fastener to a workpiece, the fastening system comprising:
   a movable carriage on which the workpiece is placed;
   a memory configured to store computer-executable instructions;
   one or more processors that execute the computer-executable instructions stored in the memory, wherein
      the one or more processors execute the computer-executable instructions to cause the fastening system to detect a position of a fastener temporarily tightened onto the workpiece, as coordinates in a coordinate system of the movable carriage; and
      the memory is configured to store the detected coordinates;
   a robot configured to determine a position of the fastener based on the coordinates stored in the memory and retighten the fastener that is at the determined position;
   a temporary tightening device that is operated by an operator and is configured to temporarily tighten the fastener onto the workpiece in accordance with operation by the operator,
   a working carriage on which the temporary tightening device is placed,
   wherein the temporary tightening device includes a socket configured to make contact with the fastener,
   the one or more processors cause the fastening system to detect coordinates of the socket,
   the movable carriage includes a reference pin as a reference position in the coordinate system, and
   the reference pin is configured to be coupled to the working carriage and the robot.

2. The fastening system according to claim 1, further comprising:
   a scanner configured to detect an identifier assigned to the movable carriage,
   wherein the memory stores the coordinates and the identifier in association with each other.

3. The fastening system according to claim 1, wherein
   a plurality of fasteners are temporarily tightened to the workpiece, and
   the memory stores the coordinates and an order in which the fasteners have been temporarily tightened, in association with each other, for each position at which each fastener has been temporarily tightened.

4. The fastening system according to claim 1, further comprising:
   a torque sensor configured to detect a torque applied to the fastener by the temporary tightening device,
   wherein the memory stores the coordinates and the torque in association with each other.

5. A fastening method for fastening a fastener to a workpiece placed on a movable carriage, the fastening method comprising:
   temporarily tightening the fastener to the workpiece by a temporary tightening device placed on a working carriage;
   detecting, using one or more processors, a position of the fastener temporarily tightened onto the workpiece, as coordinates in a coordinate system of the movable carriage;
   storing the coordinates, using a memory; and
   determining, using a robot, a position of the fastener based on the coordinates stored in the memory and retightening, using the robot, the fastener that is at the determined position, wherein
   the temporary tightening device includes a socket configured to make contact with the fastener,
   the movable carriage includes a reference pin as a reference position in the coordinate system,
   the fastening method further comprising:
      in detecting the position of the fastener, detecting coordinates of the socket,
      in temporarily tightening, coupling the reference pin to the working carriage, and
      in retightening, coupling the reference pin to the robot.

* * * * *